Sept. 9, 1952      A. KING      2,609,929

GRAIN AND WEED RECLAIMING ACCESSORY

Filed April 4, 1949

Inventor:
Alexander King.
By Autherdonhouse & Co
his Atty's.

Patented Sept. 9, 1952

2,609,929

UNITED STATES PATENT OFFICE 2,609,929

GRAIN AND WEED RECLAIMING ACCESSORY

Alexander King, Carman, Manitoba, Canada

Application April 4, 1949, Serial No. 85,288

1 Claim. (Cl. 209—135)

My invention relates to new and useful improvements in grain and weed seed reclaiming accessories, an object of my invention being to provide a device of the character herewithin described whereby noxious weed seed may be extracted from the air stream of a harvester combine thereby preventing them from being redistributed over the land being harvested.

A further object of my invention is to provide a device of the character herewithin described which in conjunction with the foregoing object retrieves a large portion of grain kernels and unthreshed head normally carried upon the air stream of a harvester combine.

Another object of my invention is to provide a device of the character herewithin described which incorporates means whereby the percentage extraction of weed seed and grain kernels may be varied as desired.

A still further object of my invention is to provide a device of the character herewithin described whereby the recovered grain and weed seeds may be deposited in a separate tank or container for disposition elsewhere as desired.

Another object of my invention is to provide a device of the character herewithin described which is readily adaptable to the majority of harvester combines and which is extremely economical in operation and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
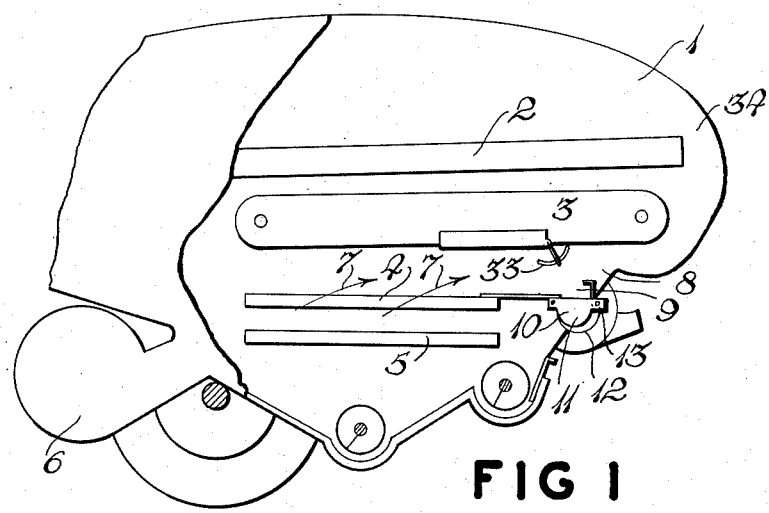
Figure 1 is a fragmentary side elevation of the rear portion of a conventional harvester combine with my device in situ.

While harvester combining is regarded as the most efficient method of harvesting grain upon farms of relatively large area, it has hitherto had the disadvantage of redistributing noxious weed seeds with the chaff thereby making weed control extremely difficult.

The present invention overcomes or eliminates this disadvantage and furthermore recovers at the same time a large portion of the grain kernels normally carried to the rear of a combine by the high speed air-stream, which grain kernels together with the weed seeds may be collected separately and disposed of as desired either by burning or by utilising same as cattle feed.

Proceeding therefore to describe my invention in detail it will be seen upon reference to the accompanying drawings that I have illustrated the rear section of a conventional harvester combine 1 sectioned to show the interior thereof. This rear section includes a straw rack 2, a grain conveyor 3, a chaffing table 4 having a sieve 5 therebeneath and a chaff blowing unit 6.

The blowing unit 6 produces a stream of air through the sieve 5 and the chaffer 4 which provides the initial separation of the chaff from the grain kernels and which is directed rearwardly after passing through the chaffer following the arrows 7 being expelled from behind the harvester at 8 below the grain conveyor 3. My grain and weed seed reclaiming accessory collectively designated 9 includes an intercepting assembly 10 situated transversely across the main combine air-discharge path comprising an elongated trough 11 having the base 12 thereof inclining downwardly from the horizontal when in situ. This trough is provided with a transverse attachment bracket 13 on the distal end thereof by which it is secured to the side framework of the combine.

Figure 2:
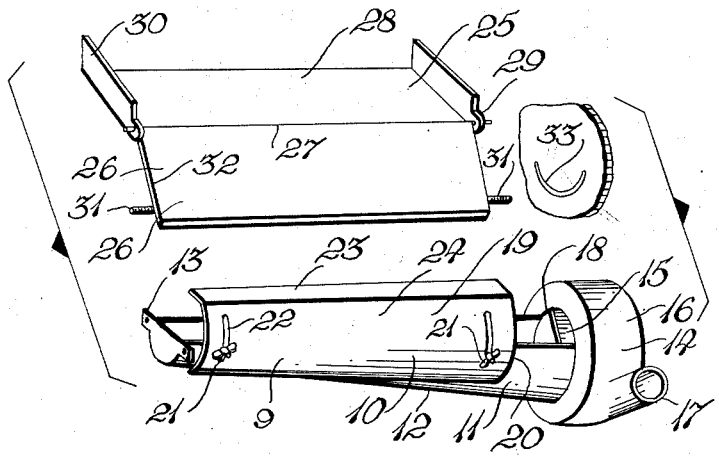
Figure 2 is a perspective view of my device per se.

The opposite end of the trough 11 is attached to a blower unit 14 comprising a fan 15 and a circular casing 16 having an outlet 17. Reference to Figure 2 of the accompanying drawings will show that trough 11 inclines downwardly towards the blower unit 14 and communicates with the interior thereof by means of the aperture 18 within the casing 16 so that any grain within trough 11 is fed by gravity and vibration to the fan unit 14 as will hereinafter be described.

A substantially vertical plate 19 is adjustably secured to the rear wall 20 of trough 11 by means of bolt 21 engaging with a pair of vertical slots 22 formed within said plate. In order to provide adequate support to plate 19, this has been curved to conform substantially to the contour of the rear wall 20 of the trough and from the foregoing it will be appreciated that the plate 19 is movable vertically within its own plane and projects upwardly into the main combine air-discharge path as clearly shown in Figure 1 of the accompanying drawings. A trough-hooding flange 23 is provided along the upper edge 24 of the plate 19 which in this embodiment has been angulated at right angles to the main plate to overhang the trough 11.

I have provided a further baffle means collectively designated 25 taking the form of an overhanging air-deflecting panel 26 which is hingedly connected along the upper edge 27 thereof to a supporting bracket 28. Bracket 28 is adapted to be secured to the underside of the aforementioned grain conveyor 3 substantially forward of the aforementioned trough 11 and in this embodiment the panel 26 is hinged to a pair of rearwardly projecting lugs 29 formed within the attaching portion 30 thereof.

In order to provide adjustment to the aforementioned air-deflecting panel 26 I provide a pair of screwthreaded studs 31 extending from the side edges 32 of the panel 26 which are engageable within arcuate slots 33 within the side panels 34 of the combine 1, the desired position of the panel 36 being maintained by means of wing nuts or the like (not illustrated) in the conventional manner. From the foregoing it will be appreciated that the air-deflecting panel 26 can be adjusted to incline downwardly and rearwardly from the bracket 28 at different degrees of angulation between the horizontal and the vertical.

In operation the main air-stream from the blower 6 follows the arrows 7 to discharge rearwardly from the combine at 8 carrying with it weed seeds, unthreshed heads of grain, and grain kernels. By raising or lowering the trough attached plate 19 a greater or lesser proportion of the weed seeds and the like are intercepted and deposited within the trough 11, the heavier comminutive material being towards the lower portion of the air-stream. Due to the aforementioned inclination of trough 11 the material deposited therein will be fed by gravity and vibration to the blower 14 from whence they may be transferred via outlet 17 to a trailer tank or to a hopper secured to the combine for subsequent disposal. In this connection it is to be appreciated that the fan unit 15 of the blower 14 may be driven from the harvester combine source of power by any convenient system of chains or pulleys as may be desired.

In order to effect further interception the adjustable air-deflecting panel 26 is positioned in order to deflect the main body of the air-stream downwardly towards the plate 19, the chaff still being blown rearwardly by the discharging air-stream. This has the effect of increasing the extraction of the heavier materials as well as causing direct interception of grain kernels which are deflected directly into the trough.

The desired adjustment of plate 19 and panel 26 vary with the conditions under which the harvester combine is operating as well as the degree of interception required.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

An intercepting assembly for grain and weed seed reclaiming for attachment adjacent the chaff discharge end of combines and the like, comprising in combination a substantially semi-cylindrical trough transversely situated adjacent said chaff discharge end, a blower at one end thereof, said trough inclining downwardly toward the blower end thereof, baffle means adjustably projectable across the main combine chaff discharge path, said means comprising a vertical plate movable in its own plane secured to the rear wall of said trough and extending upwardly therefrom into the chaff discharge path, said plate being curved to complement the configuration of said wall, a horizontal flange along the upper edge of said plate extending over and substantially shrouding the open upper side of said trough for deflecting downwardly into said trough grain and weed seeds impinging upon said plate, and further baffle means within said chaff discharge path cooperating with said first mentioned means, said further baffle means comprising an overhanging air-deflecting panel hingedly mounted along the horizontal edge thereof above said trough and being inclinable downwardly and rearwardly over said trough between the horizontal and the vertical for directing the air stream towards said first mentioned baffle means, and means for maintaining said panel at different degrees of angulation from the horizontal.

ALEXANDER KING.

REFERENCES CITED

The following references are of record in the file of this patent:

UNITED STATES PATENTS

| Number | Name | Date |
|---|---|---|
| 216,740 | King | June 24, 1879 |
| 287,665 | Graves | Oct. 30, 1883 |
| 525,301 | Whitmore | Aug. 28, 1894 |
| 765,821 | Dornton | July 26, 1904 |
| 766,163 | Bradley | Aug. 2, 1904 |
| 792,795 | Schauer | June 20, 1905 |
| 821,819 | Neumann | May 29, 1906 |
| 840,724 | Sweet | Jan. 8, 1907 |
| 921,374 | Donovan | May 11, 1909 |
| 1,031,144 | Murray | July 2, 1912 |
| 1,093,853 | Hofmann | Apr. 21, 1914 |
| 1,116,485 | Reddy | Nov. 10, 1914 |
| 1,264,023 | Davis | Apr. 23, 1918 |
| 2,019,274 | Seymour | Oct. 29, 1935 |
| 2,222,282 | Court | Nov. 19, 1940 |

FOREIGN PATENTS

| Number | Country | Date |
|---|---|---|
| 121,486 | Germany | June 19, 1901 |
| 138,407 | Austria | July 25, 1934 |